(12) United States Patent
Okubo

(10) Patent No.: US 8,254,645 B2
(45) Date of Patent: Aug. 28, 2012

(54) IMAGE PROCESSING APPARATUS AND METHOD, AND PROGRAM

(75) Inventor: Atsushi Okubo, Tokyo (JP)

(73) Assignee: Sony Corporation, Tokyo (JP)

( * ) Notice: Subject to any disclaimer, the term of this patent is extended or adjusted under 35 U.S.C. 154(b) by 873 days.

(21) Appl. No.: 12/356,864

(22) Filed: Jan. 21, 2009

(65) Prior Publication Data

US 2009/0196467 A1 Aug. 6, 2009

(30) Foreign Application Priority Data

Feb. 5, 2008 (JP) ............................... P2008-025148

(51) Int. Cl.
*G06K 9/00* (2006.01)
(52) U.S. Cl. ........ 382/118; 382/106; 382/190; 382/209; 382/216
(58) Field of Classification Search .................. 382/118, 382/190, 203; 348/169, 135
See application file for complete search history.

(56) References Cited

U.S. PATENT DOCUMENTS

| | | | |
|---|---|---|---|
| 2002/0159627 A1 | 10/2002 | Schneiderman et al. | |
| 2007/0047775 A1* | 3/2007 | Okubo | 382/118 |
| 2010/0034427 A1* | 2/2010 | Fujimura et al. | 382/106 |

FOREIGN PATENT DOCUMENTS

JP 2000-322577 11/2000
WO WO 2005/052851 A2 6/2005

OTHER PUBLICATIONS

Shan Du, et al., Face recognition under pose variations, Journal of the Franklin Institute, vol. 343, No. 6, XP-025235512, Sep. 1, 2006, pp. 596-613.

* cited by examiner

*Primary Examiner* — Matthew Bella
*Assistant Examiner* — Ruiping Li
(74) *Attorney, Agent, or Firm* — Oblon, Spivak, McClelland, Maier & Neustadt, L.L.P.

(57) ABSTRACT

An image processing apparatus includes a holding unit configured to hold, for each combination of a first angle indicating a face direction of a first face image which includes a human face and a second angle indicating a face direction of a second face image which includes a human face, a learning dictionary including information related to positions of feature points associating the first and second face images when a similarity degree between the first and second face images is estimated, a selection unit configured to select the learning dictionary held for each combination in accordance with the combination of the first and second angles, and a similarity degree estimation unit configured to estimate a facial similarity degree between the first and second face images on the basis of feature amounts extracted from the face images corresponding to the positions of the feature points included in the selected learning dictionary.

18 Claims, 9 Drawing Sheets

IMAGE PROCESSING APPARATUS AND METHOD, AND PROGRAM

CROSS REFERENCES TO RELATED APPLICATIONS

The present invention contains subject matter related to Japanese Patent Application JP 2008-025148 filed in the Japanese Patent Office on Feb. 5, 2008, the entire contents of which are incorporated herein by reference.

BACKGROUND OF THE INVENTION

1. Field of the Invention

The present invention relates to an image processing apparatus and method, and a program. In particular, the invention relates to an image processing apparatus and method, and a program with which an image identification performance can be easily improved.

2. Description of the Related Art

Up to now, various technologies for identifying whether face images are of the same person or not have been proposed.

The applicant of the present invention invented an image processing apparatus for improving a recognition accuracy in a case where a recognition processing is performed by using a correlation between two feature amounts, and has already filed the patent application as Japanese Patent Application JP 2006-332302 (hereinafter, which will be referred to as previous application).

According to the previous application, the accuracy of the recognition processing can be improved, but it is possible to identify faces at a high accuracy facing only in a front direction or a particular direction. This is because when the direction of the face is changed, an image pattern of a facial feature is significantly changed, and a similarity between the facial features of the same person is likely to be lost.

In addition, a method of identifying a face facing in an arbitrary direction has been proposed, for example, in Japanese Unexamined Patent Application Publication No. 2000-322577.

According to Japanese Unexamined Patent Application Publication No. 2000-322577, by using a standard face 3D model of a human face, a face facing in an arbitrary direction is identified. According to this method, two face images captured in different directions are compared with each other, and one of the face images is affixed to a face 3D model. Then, a face image equivalent to the same direction as the other of the face images is synthesized to realize the face identification in the different directions.

In addition, a thesis disclosed by in Volker Blanz, et al, "Face Recognition Based on Fitting a 3D Morphable Model", has proposed a method of performing a face identification by using a parameter most approximate to an input face image from a face image synthesized by morphing a standard 3D face deformation model on the basis of various parameters.

SUMMARY OF THE INVENTION

However, the above-mentioned technologies in the related art including Japanese Unexamined Patent Application Publication No. 2000-322577 and the thesis are based on the method of synthesizing the faces in different directions by using a CG (Computer Graphics) method from the standard face 3D model. In order to obtain such a 3D model, a highly accurate 3D measurement apparatus is demanded. Thus, in general, it is only possible to use a model generated from previously obtained data when the apparatus is mounted to a household product, in particular.

For this reason, it is extremely difficult to update the model in accordance with a person having a face shape that is not matching with the model or change the model into a model specialized to the identification for a small number of limited people such as a family.

In addition, the face image synthesized by applying the face image to the standard face 3D model and rotating the model often decreases an identification performance because an appropriate synthesis is difficult to perform in a case where a difference between the model and the actual face shape is large. The method of obtaining an approximate image by morphing the 3D face deformation model on the basis of the parameters has such a problem that calculations take a long period of time.

The present invention has been made in view of the above-mentioned circumstances, and it is desirable to easily improve the image identification performance.

According to an embodiment of the present invention, there is provided an image processing apparatus, including: holding means for holding, for each combination of a first angle indicating a direction of a face of a first face image which includes a human face and a second angle indicating a direction of a face of a second face image which includes a human face, a learning dictionary including information related to positions of feature points which associate the first face image with the second face image if a similarity degree between the first face image and the second face image is estimated; selection means for selecting the learning dictionary held for each combination of the first angle and the second angle in accordance with the combination of the first angle and the second angle; and similarity degree estimation means for estimating a facial similarity degree between the first face image and the second face image on the basis of feature amounts extracted from the first face image and the second face image corresponding to the positions of the feature points included in the selected learning dictionary.

The image processing apparatus according to the embodiment may further include identification means for identifying the first face image and the second face image on the basis of the estimated similarity degree.

In the image processing apparatus according to the embodiment, the second face image may be registered in advance while being associated with the extracted feature amounts and the second angle.

The image processing apparatus according to the embodiment may further include detection means for detecting a part of the first face image from an image including a human being; facial feature detection means for detecting a facial feature position which is a feature of the face from the detected first face image; face angle estimation means for estimating the first angle on the basis of the detected first face image and the facial feature position; and extraction means for extracting a feature amount from an image in the vicinity of the facial feature position in the detected first face image, in which the select means selects the learning dictionary in accordance with the combination of the estimated first angle and the registered second angle, and the similarity degree estimation means estimates the similarity degree on the basis of the feature amount extracted from the first face image and the feature amount of the registered second face image corresponding to the positions of the feature points included in the selected learning dictionary.

In the image processing apparatus according to the embodiment, the holding means may hold the learning dictionaries for all the combinations in a case where the direction indicated by the first angle is set in three stages including a left direction, a front direction, and a right direction and the direction indicated by the second angle is set in three stages including a left direction, a front direction, and a right direction.

In the image processing apparatus according to the embodiment, the learning dictionary may include a predetermined threshold which functions as a reference for identifying the first face image and the second face image, and the identification means may identify whether the face of the first face image and the face the second face image are a same person or different persons on the basis of a result of a comparison between the estimated similarity degree and the threshold.

According to an embodiment of the present invention, there is provided an image processing method including the steps of: selecting a learning dictionary held for each combination of a first angle indicating a direction of a face of a first face image which includes a human face and a second angle indicating a direction of a face of a second face image which includes a human face, for each combination of the first angle and the second angle in accordance with the combination of the first angle and the second angle, the learning dictionary including information related to positions of feature points which associate the first face image with the second face image when a similarity degree between the first face image and the second face image is estimated; and estimating a facial similarity degree between the first face image and the second face image on the basis of feature amounts extracted from the first face image and the second face image corresponding to the positions of the feature points included in the selected learning dictionary.

A program according to an embodiment of the present invention includes a program corresponding to the above-mentioned image processing method.

In the image processing apparatus, the image processing method, and the program according to the above-described embodiment of the present invention, the learning dictionary including the information related to the positions of the feature points which associate the first face image with the second face image when the similarity degree between the first face image and the second face image is estimated is held for each combination of the first angle indicating the direction of the face of the first face image which includes the human face and the second angle indicating the direction of the face of the second face image which includes the human face, the learning dictionary held for each combination of the first angle and the second angle is selected in accordance with the combination of the first angle and the second angle, and the facial similarity degree between the first face image and the second face image is estimated on the basis of the feature amounts extracted from the first face image and the second face image corresponding to the positions of the feature points included in the selected learning dictionary.

According to another embodiment of the present invention, there is provided an image processing apparatus including: holding means for holding, for each combination of a first angle indicating a direction of an object or a living matter having a predetermined shape and feature of a first image which includes the object or the living matter and a second angle indicating a direction of an object or a living matter having a predetermined shape and feature of a second image which includes the object or the living matter, a learning dictionary including information related to positions of feature points which associate the first image with the second image when a similarity degree between the first image and the second image is estimated; selection means for selecting the learning dictionary held for each combination of the first angle and the second angle in accordance with the combination of the first angle and the second angle; and similarity degree estimation means for estimating a similarity degree of the object or the living matter between the first image and the second image on the basis of feature amounts extracted from the first image and the second image corresponding to the positions of the feature points included in the selected learning dictionary.

According to another embodiment of the present invention, there is provided an image processing method including the steps of: selecting a learning dictionary held for each combination of a first angle indicating a direction of an object or a living matter having a predetermined shape and feature of a first image which includes the object or the living matter and a second angle indicating a direction of an object or a living matter having a predetermined shape and feature of a second image which includes the object or the living matter, for each combination of the first angle and the second angle in accordance with the combination of the first angle and the second angle, the learning dictionary including information related to positions of feature points which associate the first image with the second image when a similarity degree between the first image and the second image is estimated; and estimating a similarity degree of the object or the living matter between the first image and the second image on the basis of feature amounts extracted from the first image and the second image corresponding to the positions of the feature points included in the selected learning dictionary.

A program according to another embodiment of the present invention includes a program corresponding to the above-mentioned image processing method.

In the image processing apparatus, the image processing method, and the program according to the above-described other embodiment of the present invention, the learning dictionary including information related to the positions of the feature points which associate the first image with the second image when the similarity degree between the first image and the second image is estimated is held for each combination of the first angle indicating the direction of the object or the living matter having the predetermined shape and feature of the first image which includes the object or the living matter and the second angle indicating the direction of the object or the living matter having the predetermined shape and feature of the second image which includes the object or the living matter; selection means for selecting the learning dictionary held for each combination of the first angle and the second angle in accordance with the combination of the first angle and the second angle; and the similarity degree of the object or the living matter between the first image and the second image is estimated on the basis of the feature amounts extracted from the first image and the second image corresponding to the positions of the feature points included in the selected learning dictionary.

As described above, according to the embodiments of the present invention, the image identification performance can be easily improved.

DESCRIPTION OF THE PREFERRED EMBODIMENTS

Hereinafter, embodiments of the present invention will be described with reference to the drawings.

The embodiments of the present invention have the following features. In a case where a direction (angle) of a face in an input face image (hereinafter, which may also be referred to as input face) and an angle of a face in a registered face image (hereinafter, which may also be referred to as registered face) are significantly different from each other, an image pattern of the respective feature points of the face are largely changed, and it becomes difficult to perform an identification processing for those face images at a high accuracy. While focusing on the above-mentioned circumstances, information such as feature points and feature amounts used for identifying whether this is the same person or different persons is appropriately selected in accordance with a combination of these angles.

In view of the above, first, with reference to FIG. 1, a description will be given of a principle that the face identification performance can be improved while a pattern of a combination of the directions of the input face and the registered face is set as a parameter to be applied to the face identification processing.

Figure 1:
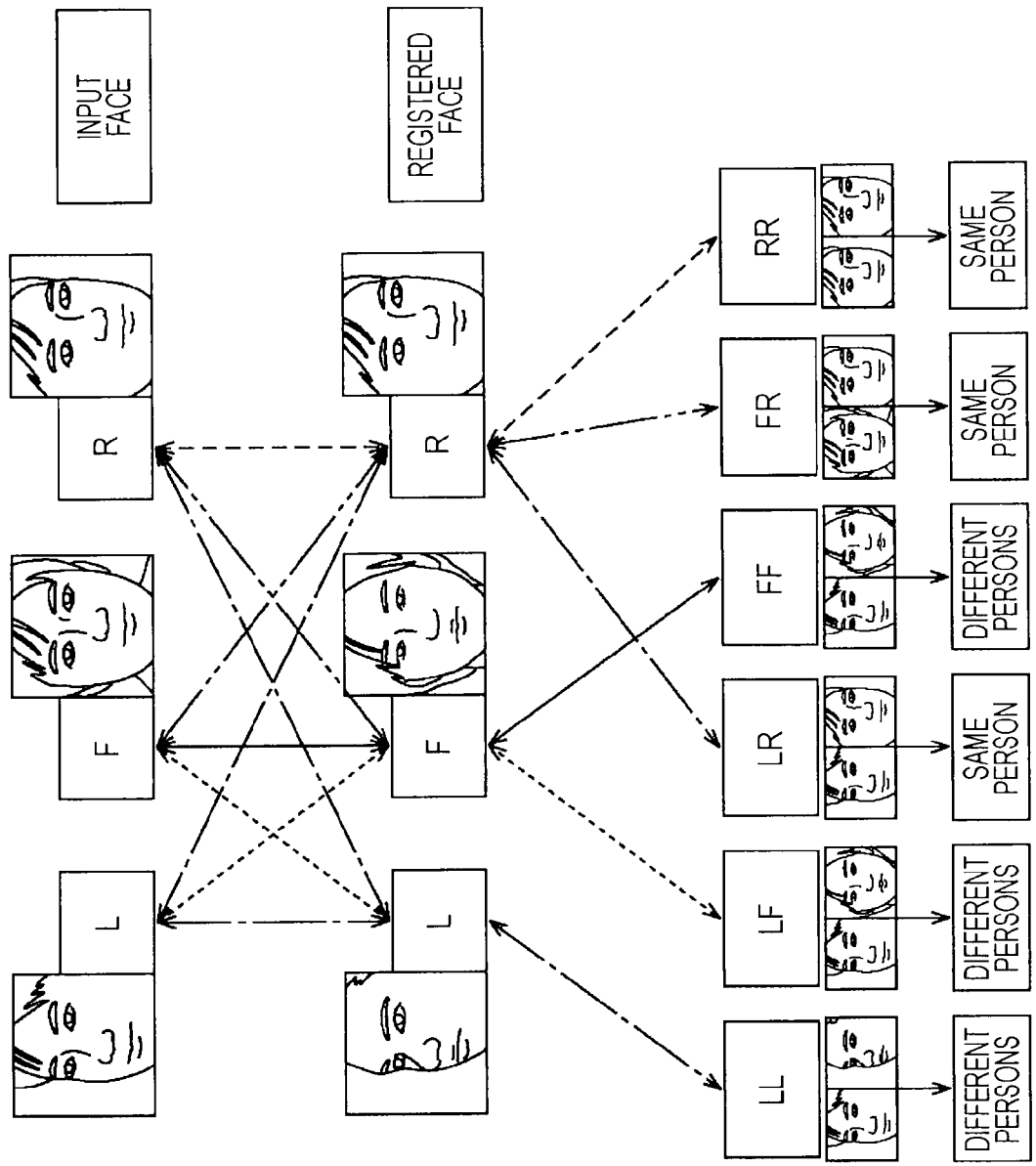
FIG. 1 is an explanatory diagram for describing combinations of input faces and registered faces.

In FIG. 1, input faces illustrated in the upper stage represent images of a face facing to a left side (L), a face facing to a front side (F), and a face facing to a right side (R). In the example of FIG. 1, all the images L, F, and R are face images of a user A, that is, face images of the same person.

In addition, registered faces linked to the respective face images of the input faces by various dotted lines represent images of a face facing to a left side (L), a face facing to a front side (F), and a face facing to a right side (R), similarly to the input faces in the upper stage. In the example of FIG. 1, L and F are face images of a user B and a user C, that is, face images of different persons from the user A, and only R is the face image of the user A, that is, a face image of the same person as the user A.

In the lower stage of FIG. 1, results of the face identification linked to the respective face images of the registered faces by the various dotted lines are illustrated. The face identification results are identification results based on a combination of the input face and the registered face which are linked by the same type of the dotted line. For example, when a focus is made on a combination of the input face L and the registered face L, the combination is composed of a side face of the user A facing to the left side and a side face of the user B facing to the left side. Thus, the identification result shows the different persons as denoted by LL.

In a similar manner, for example, in the case of a combination of the input face L and the registered face F, LF shows the different persons, but in the case of a combination of the input face L and the registered face R, although the facing directions are left and right, both are the side faces of the user A, and thus LR shows the same person.

In addition, for example, in a case where the input face F is combined with the registered faces L, F, and R, FL and FF show the different persons, and FR shows the same person. Furthermore, in a similar manner, for example, in a case where the input face R is combined with the registered faces L, F, and R, RL and RF show the different persons, and RR shows the same person.

In this way, in a case where the direction of the input face is set in the three directions including L, F, and R, and the direction of the registered face is set in the three directions including L, F, and R, combinations of these angles are nine patterns including LL, LF, LR, FL, FF, FR, RL, RF, and RR. Therefore, for each combination of these angles, information indicating how to perform a face identification processing (a processing for estimating a similarity degree of the face images) by using which feature amount at which feature point is sorted and held. By referring to the information in accordance with the combination of the angles of the face images at the time of the face identification processing, even when the facing directions of the face in the input face and the registered face are different from each other, it is possible to perform the face identification at a high accuracy.

It should be noted that in the example of FIG. 1, among the nine patterns of the angle combinations, although the directions of the input face and the registered face are opposite, but because the combinations are the same, LF and FL, LR and RL, and FR and RF are collectively sorted into LF, LR, and FR, respectively. Hereinafter, to simplify the description, according to the present embodiment too, similarly the example of FIG. 1, by sorting out those combinations, the description will be given with the following six combinations including LL, LF, LR, FF, FR, and RR. However, the nine combinations may of course be used, and also the number of combinations may be increased by further dividing the angle into smaller segments instead of the three stages of the left direction, the front direction, and the right direction. In a case where the number of combinations is increased, it is possible to further improve the accuracy of the face identification by the increase in the number of combinations.

Also, the description will be given while the information sorted and held for each combination of the angles described with reference to FIG. 1 is hereinafter referred to as learning dictionary sorted by angle combination.

Next, on the basis of the above-mentioned principle, by using such learning dictionaries sorted by angle combinations, the image identification processing apparatus adapted to perform the identification processing for the input face and the registered face will be described.

Figure 2:
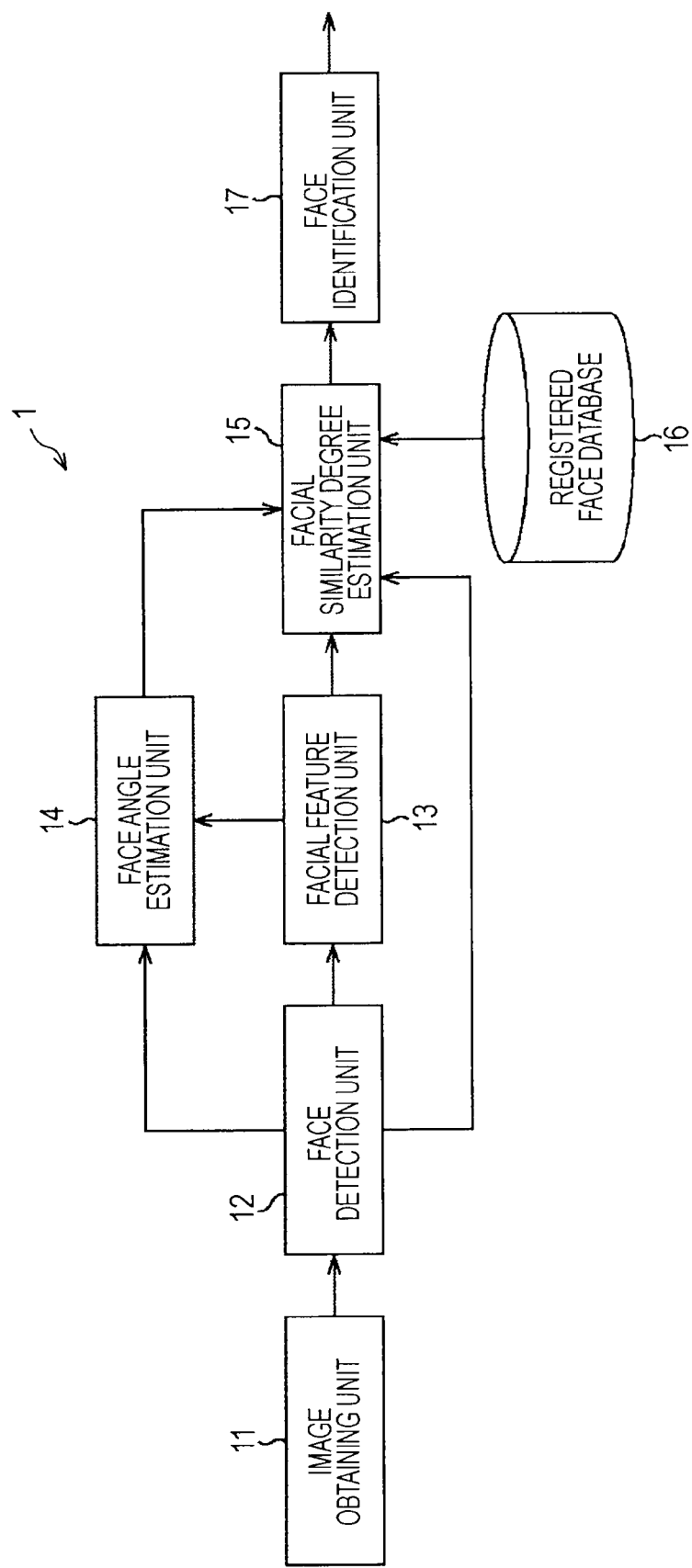
FIG. 2 illustrates a configuration of an image identification apparatus according to an embodiment to which the present invention is applied.

FIG. 2 is a block diagram of a configuration of the image identification apparatus according to an embodiment to which the present invention is applied.

An image identification apparatus 1 is an apparatus adapted, for example, to perform the image identification processing such as a digital camera, a personal computer, or a monitoring camera.

As illustrated in FIG. 2, the image identification apparatus 1 is composed by including an image obtaining unit 11, a face detection unit 12, a facial feature detection unit 13, a face angle estimation unit 14, a facial similarity degree estimation unit 15, a registered face database 16, and a face identification unit 17.

The image obtaining unit 11 has a configuration composed, for example, by including a camera or the like. The image obtaining unit 11 has a function of picking up an image of a human being or obtaining an image picked up by an externally installed camera or another apparatus. In other words, the image obtained by the image obtaining unit 11 is an image at least including a part of a human face. The image obtained by the image obtaining unit 11 is supplied to the face detection unit 12.

It should be noted that according to the present embodiment, the identification processing for the human face image is described as an example, but for example, the present invention can also be applied to a processing of identifying other objects such as animals or automobiles. That is, the present invention can also be applied to a processing of identifying an image including an object or a living matter having a predetermined shape and feature.

The face detection unit 12 performs a predetermined image analysis processing on the image supplied from the image obtaining unit 11 to extract a part corresponding to the human face.

Figure 3:
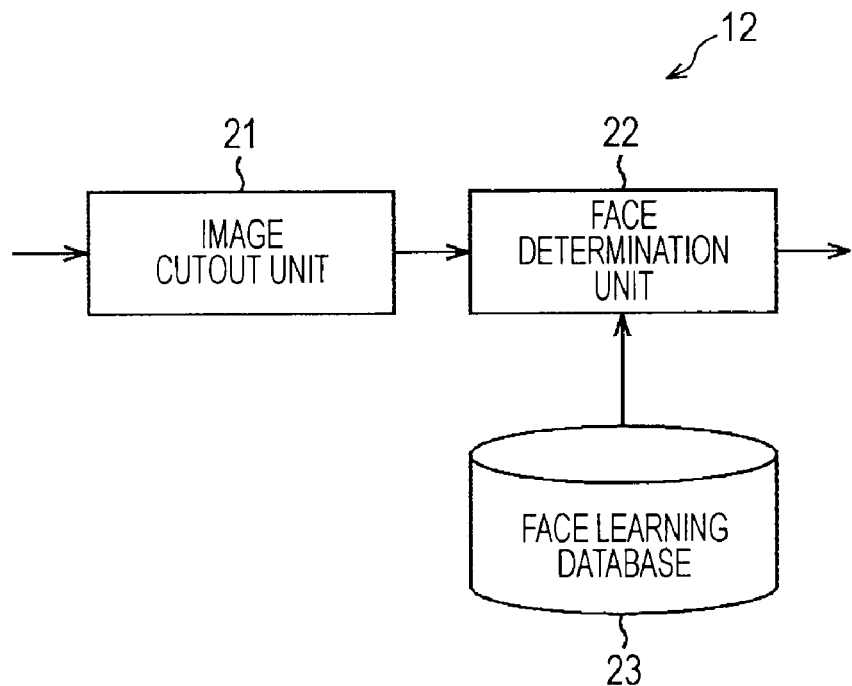
FIG. 3 illustrates a detailed configuration example of a face detection unit.

To be more specific, as illustrated in FIG. 3, the face detection unit 12 is composed by including an image cutout unit 21, a face determination unit 22, and a face learning database 23. In the face learning database 23, statistically learnt information used for extracting a part corresponding to a face included in a predetermined image is stored.

Herein, first, the image cutout unit 21 sequentially cuts out images of a predetermined area (for example, images of 20×20 pixels) in the image from the image obtaining unit 11, which are supplied to the face determination unit 22. Then, on the basis of the extracted information of the face image stored in the face learning database 23, the face determination unit 22 determines whether the cut-out images sequentially input from the image cutout unit 21 are face images or not. The part corresponding to the human face (the position and size of the face) is extracted, and the image of the extracted part corresponding to the human face (face image) is detected.

The image supplied from the image obtaining unit 11 is an image including a face of an identification target user. However, for example, the image may include a part other than the face in some cases such as an image where a full-length figure is captured. The face detection unit 12 scans such an image to identify an area of a human face, and extracts an image corresponding to the part of the human face. The face image (input face) detected in this way is supplied to the facial feature detection unit 13, the face angle estimation unit 14, and the facial similarity degree estimation unit 15.

Referring back to FIG. 2, the facial feature detection unit 13 performs a predetermined image analysis processing on the face image supplied from the face detection unit 12 to detect, for example, a part which becomes a feature in the human face such as the eyes, the nose, and the mouth, that is, facial feature parts.

Figure 4:
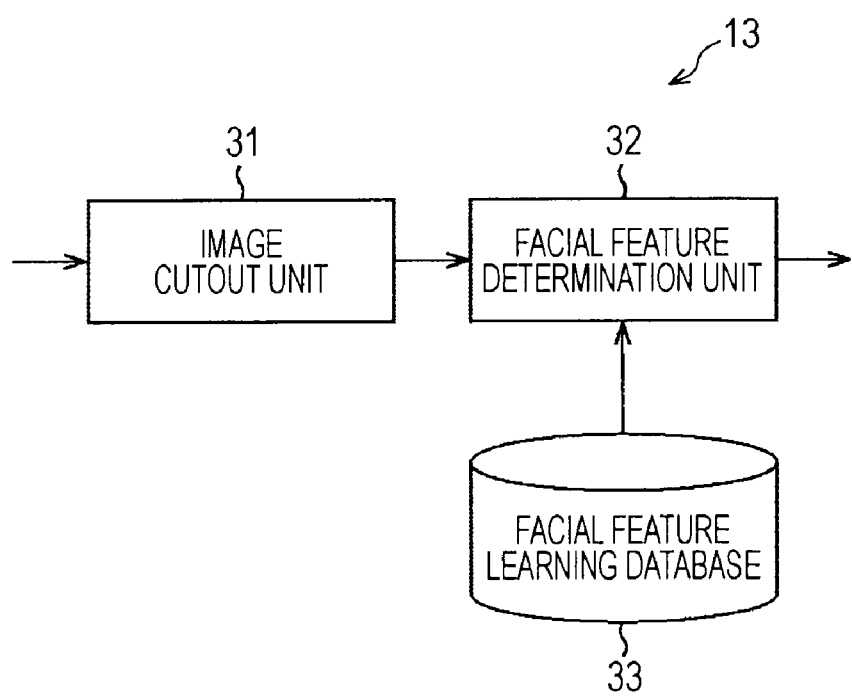
FIG. 4 illustrates a detailed configuration example of a facial feature detection unit.

To be more specific, as illustrated in FIG. 4, the facial feature detection unit 13 is composed by including an image cutout unit 31, a facial feature determination unit 32, and a facial feature learning database 33. The facial feature learning database 33 stores statistically learnt information used for extracting the facial feature parts included in a predetermined face image.

Herein, first, the image cutout unit 31 sequentially cuts out images of various sizes supposed to include the facial feature part such as, for example, the eyes, the nose, and the mouth (for example, images of 20×20 pixels) in the face image supplied from the face detection unit 12, which are supplied to the facial feature determination unit 32. Then, on the basis of the extraction information of the facial feature information stored in the facial feature learning database 33, the facial feature determination unit 32 determines whether or not the image cut out from the face image sequentially input from the image cutout unit 31 includes the facial feature parts to extract the facial feature parts.

For example, the facial feature determination unit 32 assigns a score representing a degree of the respective features of the facial feature parts for the entirety of the scanned face image (which may instead be a part of the face image), and supplies the position where the highest score is assigned and the size thereof to the face angle estimation unit 14 and the facial similarity degree estimation unit 15 as the facial feature position.

It should be noted that the feature detection processing performed in the facial feature detection unit 13 may adopt a method similar to the face detection processing of the face detection unit 12. For example, in a case where the feature points where it is difficult to perform the feature detection such as the cheeks or the forehead in the above-mentioned method are desired to be identified or in a case where a large number of positions of the feature points in the entire face are desired to be identified at a high accuracy irrespective of the angles, for example, the feature detection processing may adopt a method called adaptive sampling method or the like to detect the feature points.

While referring back to FIG. 2, the face image from the face detection unit 12 and the facial feature positions from the facial feature detection unit 13 are supplied to the face angle estimation unit 14. On the basis of the facial feature positions, the face angle estimation unit 14 estimates the direction of the face in the face image (input face), and outputs the direction as input face angle information to the facial similarity degree estimation unit 15. With this configuration, it is possible to calculate the direction of the input face (angle).

It should be noted that the estimation method for the angle of the input face is not limited to the method by using the face image and the facial feature positions, and the estimation may be performed by only using the face image. In that case, the input face angle information may be detected by the face detection unit 12. It should also be noted that in order to calculate the input face angle information at a still higher accuracy, it is preferred to use both the face image and the facial feature positions.

One or a plurality of registered faces are stored in the registered face database 16. For each registered face, information representing the direction of the registered face (hereinafter, which will be referred to as registered face angle information) and the registered face local feature amount are calculated and stored in advance.

That is, in a case where, for example, the image identification apparatus 1 registers a new registered face in the registered face database 16, by applying a predetermined image analysis processing on the new registered face, the registered face angle information and the local feature amount are obtained and stored while being associated with the registered face. Each time a registered face is newly registered, by executing such a registration processing, the registered face associated with the registered face angle information and the local feature amount is registered in the registered face database 16. It should be noted that in the registration processing, in addition to the registered face angle information and the local feature amount, for example, a name of a person of the registered face and other personal information can also be registered while being associated with the registered face.

To the facial similarity degree estimation unit 15, the face image from the face detection unit 12, the facial feature positions from the facial feature detection unit 13, and the input face angle information from the face angle estimation unit 14, as well as the registered face angle information and the local feature amount from the registered face database 16 are supplied.

The facial similarity degree estimation unit 15 selects a learning dictionary sorted by angle combinations (learning dictionary sorted by angle combinations 44A of FIG. 5) in accordance with the combination of the input face angle information and the registered face angle information. On the basis of the selected learning dictionary sorted by angle combinations, the facial similarity degree estimation unit 15 determines the feature points and feature amounts used for the similarity degree estimation and estimate the similarity degree of the faces between the input face and the registered face.

Herein, with reference to FIG. 5, a detail configuration of the facial similarity degree estimation unit 15 will be described.

Figure 5:
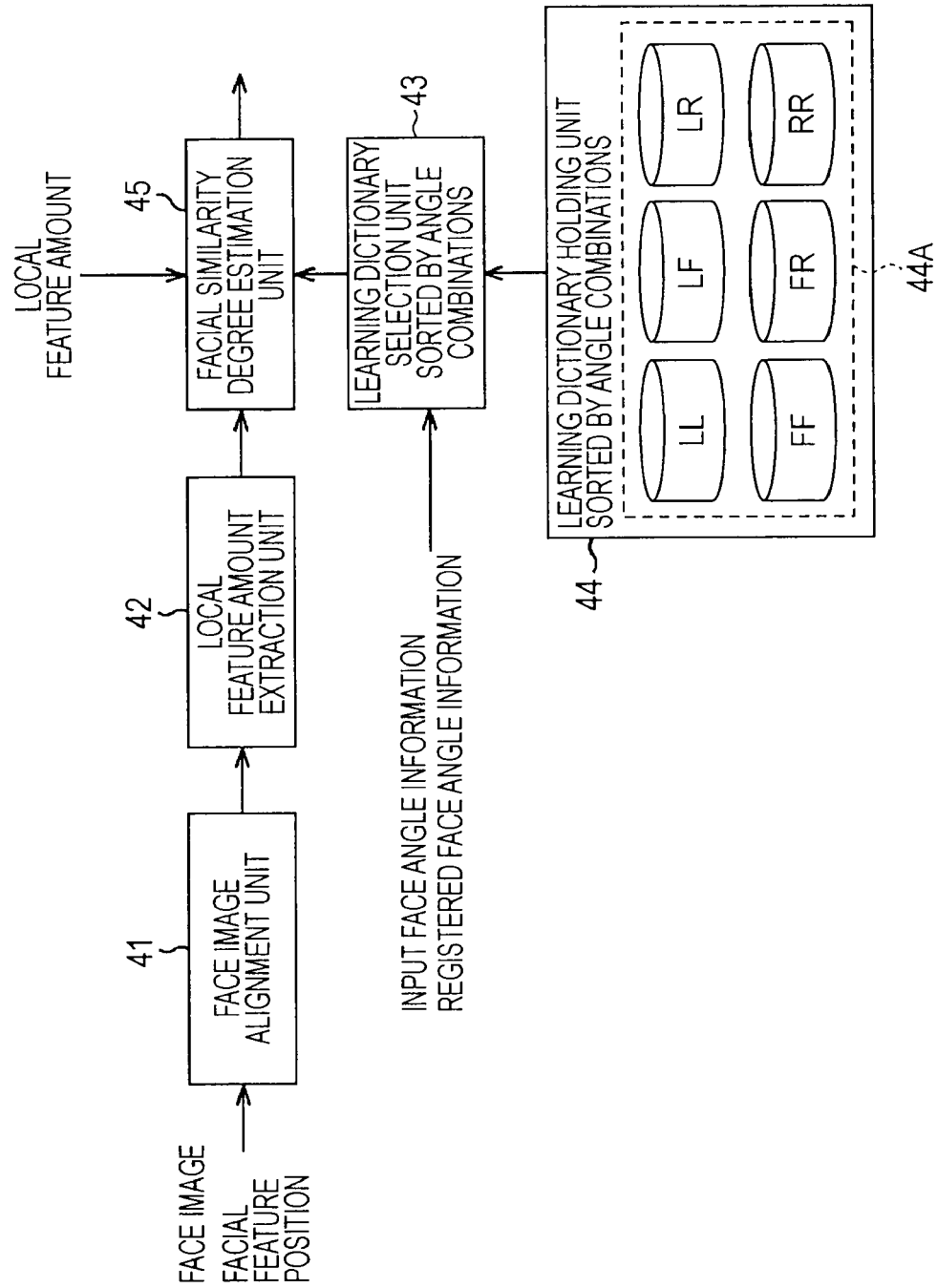
FIG. 5 illustrates a detailed configuration example of a facial similarity degree estimation unit.

As illustrated in FIG. 5, the facial similarity degree estimation unit 15 is composed by including a face image alignment unit 41, a local feature amount extraction unit 42, a learning dictionary selection unit sorted by angle combinations 43, a learning dictionary holding unit sorted by angle combinations 44, and a facial similarity degree estimation unit 45.

The face image alignment unit 41 aligns the face images by analyzing the facial feature positions supplied from the facial feature detection unit 13 and the face images supplied from the face detection unit 12, and supplies the aligned face images to the local feature amount extraction unit 42.

The local feature amount extraction unit 42 extracts the local feature amount with respect to the images in the vicinity of the facial feature positions in the face images supplied from the face image alignment unit 41.

Herein, as the method of extracting the local feature amount, for example, a method of using the images in the vicinity of the facial feature positions as they are for the calculation and a method of using a convolution computation such as Gabor filter and Gaussian derivative filter with respect to the feature position for the calculation may be adopted.

The local feature amount of the input face calculated in this way is supplied to the facial similarity degree estimation unit 45.

On the other hand, to the learning dictionary selection unit sorted by angle combinations 43, the input face angle information from the face angle estimation unit 14 and the registered face angle information from the registered face database 16 are supplied. The learning dictionary selection unit sorted by angle combinations 43 selects the learning dictionary sorted by angle combinations 44A held in the learning dictionary holding unit sorted by angle combinations 44 in accordance with the combination of the input face angle information and the registered face angle information, and supplies the learning dictionary to the facial similarity degree estimation unit 45.

The learning dictionary holding unit sorted by angle combinations 44 holds, for example, six learning dictionaries sorted by angle combinations 44A including learning dictionaries LL, LF, LR, FF, FR, and RR sorted by the combinations of the angles in the face images. This is because as described in the principle of the present invention, for example, in a case where the direction of the face is set in the three stages including the left direction (L), the front direction (F), and the right direction (R), the combinations of the learning dictionaries sorted by angle combinations 44A demands six patterns of LL, LF, LR, FF, FR, and RR. Thus, the learning dictionary holding unit sorted by angle combinations 44 holds the six learning dictionaries sorted by the combinations of the angles.

In the learning dictionaries sorted by angle combinations 44A, in addition to the information related to the positions of the feature points, the type of the feature points, and the like, sorted by the combinations of the respective angles of the face image on which a focus is made when the similarity degree of the face images is estimated, for example, a predetermined threshold functioning as a reference when it is determined whether the faces between the input face and the registered face are the same person or not (hereinafter, which will be referred to as person identification threshold) and other information useful assigned sorted by the combinations of the angles are described.

To the facial similarity degree estimation unit 45, in addition to the learning dictionaries sorted by angle combinations 44A in accordance with the combination of the angles from the learning dictionary selection unit sorted by angle combinations 43, a plurality of local feature amounts in the input face from the local feature amount extraction unit 42 and a plurality of local feature amounts in the registered face from the registered face database 16 are input.

The facial similarity degree estimation unit 45 obtains the local feature amount of the input face and the registered face local feature amount corresponding to the feature points and the types of the feature amounts described in the learning dictionaries sorted by angle combinations 44A on which a focus is made when the facial similarity degree is estimated from the plurality of local feature amounts respectively in the input face and the registered face. Then, the facial similarity degree estimation unit 45 uses the thus obtained local feature amount of the input face and registered face local feature amount to perform a predetermined operation for estimating the facial similarity degree between the input face and the registered face.

It should be noted that this facial similarity degree can be calculated, for example, through an operation method such as a normalized correlation operation.

The facial similarity degree estimation unit 45 supplies the estimated facial similarity degree together with the person identification threshold described in the learning dictionaries sorted by angle combinations 44A to the face identification unit 17.

The face identification unit 17 compares the facial similarity degree estimated by the facial similarity degree estimation unit 45 with the person identification threshold. In a case where the facial similarity degree exceeds the person identification threshold, it is identified that the input face and the registered face are the same person. On the other hand, in a case where the facial similarity degree is equal to or lower than the person identification threshold, the face identification unit 17 identifies that the input face and the registered face are different persons. The face identification unit 17 outputs such identification results to a block in a later stage (not shown).

In the above-mentioned manner, the image identification apparatus 1 is configured.

Next, a processing performed by the image identification apparatus 1 will be described.

Figure 6:
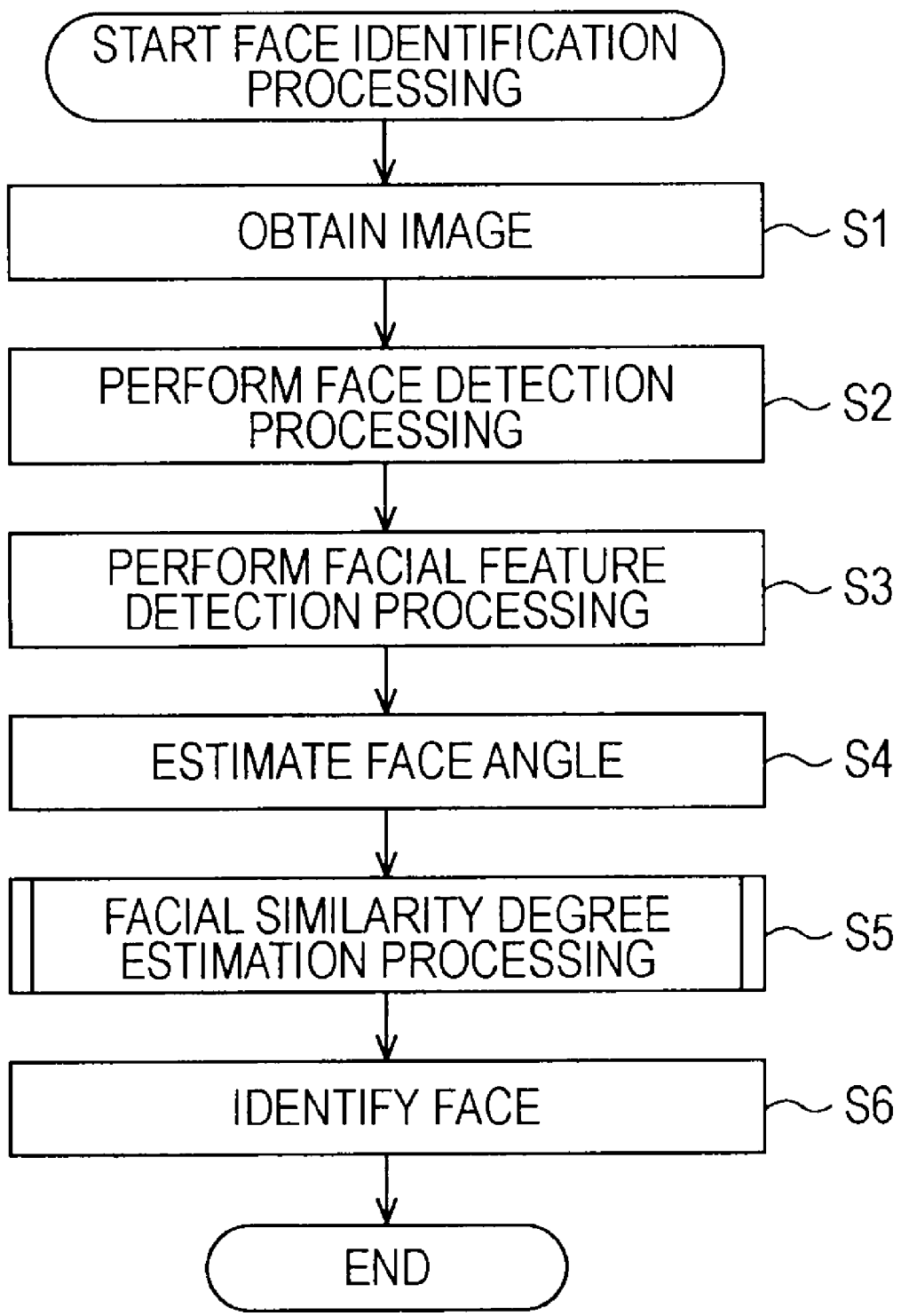
FIG. 6 is a flowchart for describing a face identification processing.

First, with reference to a flowchart of FIG. 6, the face identification processing executed by the image identification apparatus 1 of FIG. 1 will be described.

In step S1, the image obtaining unit 11 obtains, for example, an image at least including a part corresponding to the human face such as an image picked up by a camera and supplies the image to the face detection unit 12.

In step S2, the face detection unit 12 performs the face detection processing on the image supplied from the image obtaining unit 11 to detect the face image from the image including the part corresponding to the human face. The face detection unit 12 supplies the detected face image to the facial feature detection unit 13, the face angle estimation unit 14, and the facial similarity degree estimation unit 15.

In step S3, the facial feature detection unit 13 performs the facial feature detection processing for detecting the facial feature parts such as, for example, the eyes, the nose, and the mouth on the face image supplied from the face detection unit 12, and supplies the facial feature positions for each facial feature parts obtained through the processing to the face angle estimation unit 14 and the facial similarity degree estimation unit 15.

In step S4, the face angle estimation unit 14 estimates the direction of the input face on the basis of the face image supplied from the face detection unit 12 and the facial feature positions supplied from the facial feature detection unit 13, and supplies the direction as the input face angle information to the facial similarity degree estimation unit 15.

In step S5, the facial similarity degree estimation unit 15 selects the learning dictionary sorted by angle combinations 44A in accordance with a combination of the input face angle information supplied from the face angle estimation unit 14 and the registered face angle information stored in the registered face database 16. On the basis of the selected learning dictionary sorted by angle combinations 44A, the facial similarity degree estimation unit 15 performs the facial similarity degree estimation processing. The facial similarity degree estimation unit 15 supplies the estimation result of the facial similarity degree to the face identification unit 17. A detail of the facial similarity degree estimation processing will be described below with reference to a flowchart of FIG. 7.

In step S6, on the basis of the estimation result of the facial similarity degree supplied from the facial similarity degree estimation unit 15, the face identification unit 17 identifies whether the faces between the input face and the registered face are the same person or the different persons, and outputs the result to the block in the later stage (not shown). Then, the face identification processing is ended.

Figure 7:
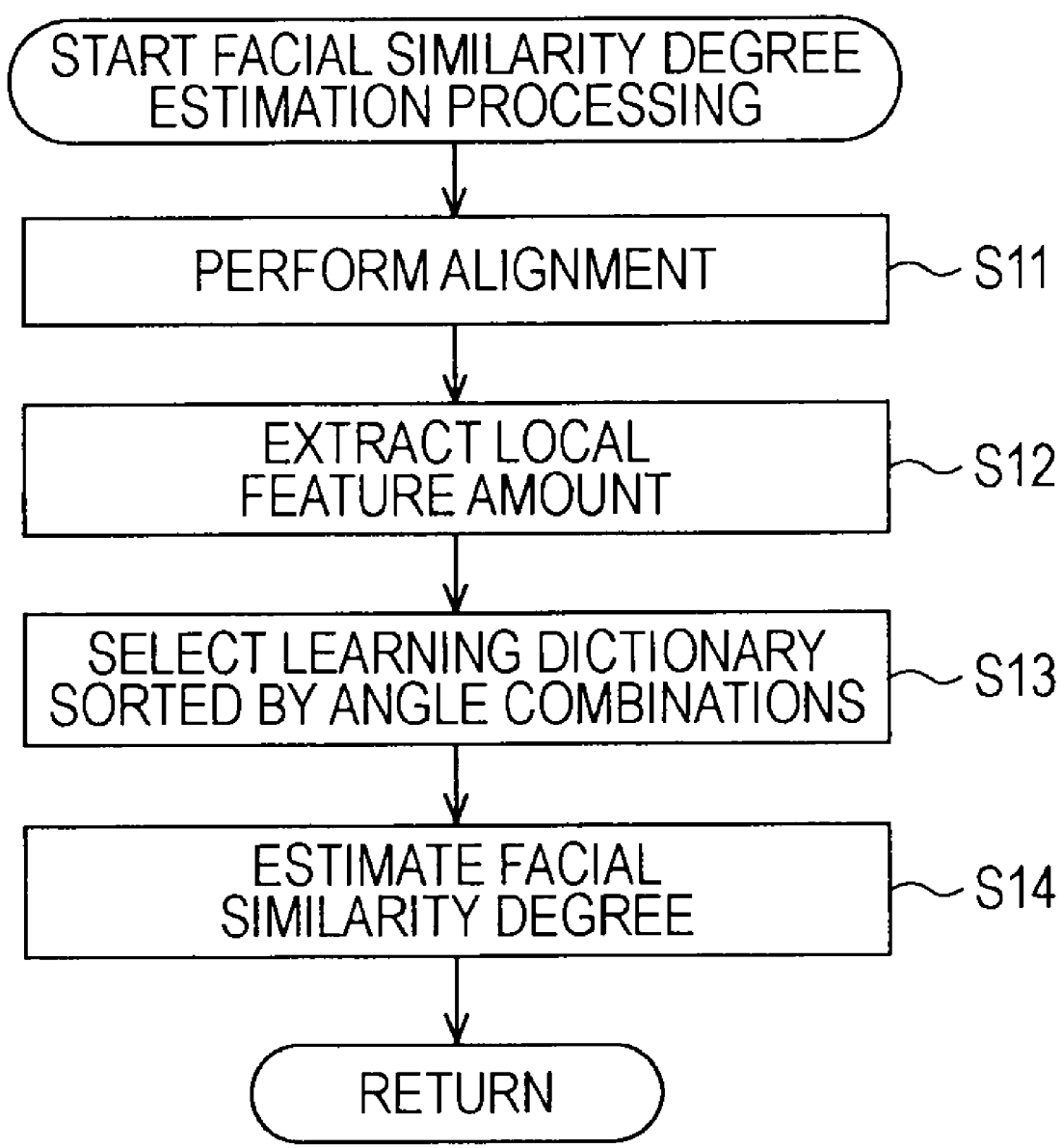
FIG. 7 is a flowchart for describing a facial similarity degree estimation processing.

Next, with reference to the flowchart of FIG. 7, a detail of the facial similarity degree estimation processing performed in step S5 of FIG. 6 will be described.

In step S11, the face image alignment unit 41 aligns the face images by analyzing the facial feature positions supplied from the facial feature detection unit 13 and the face images supplied from the face detection unit 12. The face image alignment unit 41 supplies the aligned face images to the local feature amount extraction unit 42.

In step S12, the local feature amount extraction unit 42 extracts the local feature amount with respect to the images in the vicinity of the facial feature positions in the face images supplied from the face image alignment unit 41, for example, by using the image in the vicinity of the facial feature positions or a method of using a convolution computation such as Gabor filter and Gaussian derivative filter. The local feature amount extraction unit 42 supplies the extracted local feature amount of the input face to the facial similarity degree estimation unit 45.

In step S13, the learning dictionary selection unit sorted by angle combinations 43 selects an appropriate learning dictionary from the learning dictionaries sorted by angle combinations 44A held in the learning dictionary holding unit sorted by angle combinations 44 in accordance with a combination of the input face angle information supplied from the face angle estimation unit 14 and the registered face angle information stored in the registered face database 16, and supplies the learning dictionary to the facial similarity degree estimation unit 45.

For example, in a case where the input face is facing in the left direction (L) and the registered face is facing in the right direction (R), the learning dictionary selection unit sorted by angle combinations 43 selects the learning dictionary LR from LL, LF, LR, FF, FR, and RR of the learning dictionaries sorted by angle combinations 44A, and supplies the learning dictionary LR to the facial similarity degree estimation unit 45.

The facial similarity degree estimation unit 45 obtains the local feature amount of the input face and the registered face local feature amount corresponding to the feature points and the types of the feature amounts selected by the learning dictionary selection unit sorted by angle combinations 43 and described in the learning dictionaries sorted by angle combinations 44A on which a focus is made when the facial similarity degree is estimated, and uses the local feature amounts, for example, to estimate facial similarity degree between the input face and the registered face through the normalized correlation operation.

For example, in a case where the input face is facing in the left direction (L) and the registered face is facing in the right direction (R), the learning dictionary LR is selected. Thus, the facial similarity degree estimation unit 45 obtains the local feature amount of the input face and the registered face local feature amount at a position corresponding to the optimal described in the learning dictionary LR when the similarity degree between the face image facing in the left direction (L) and the face image facing in the right direction (R) is estimated. In other words, the facial similarity degree estimation unit 45 obtains the local feature amount of the input face and the registered face local feature amount corresponding to the positions of the feature points described in corresponding to the positions of the feature points described in the learning dictionary sorted by angle combinations 44A selected in accordance with the angle combination of the face images from the plurality of local feature amounts of the input faces supplied from the local feature amount extraction unit 42 and the plurality of local feature amounts of the registered faces stored in the registered face database 16.

Then, the facial similarity degree estimation unit 45 uses the optimal local feature amount in the thus obtained combination of the directions of the input face and the registered face to estimate the facial similarity degree.

In this way, by preparing the plurality of learning dictionaries LL to RR and the like for each combination of the angles of the input face and the registered face, even in a case where the face facing in an arbitrary direction is identified, it is possible to select an appropriate learning dictionary from the learning dictionaries in accordance with the angle combinations. Thus, as compared with a case of only using a single learning dictionary, it is possible to obtain the highly accurate identification result.

That is, in general, in the image pattern of the respective feature points of the face, a change due to the direction of the face is considerably larger than a change between individual persons. It is extremely difficult to extract the feature points and the feature amounts (angle invariant feature amounts) which can be identified from the image patterns of the face angles in all the directions. According to the present embodiment, in order that the input face angle range and the registered face angle range are limited, by preparing a plurality of learning dictionaries for each set of angles in advance, the learning dictionary used for the similarity degree estimation is switched in accordance with the combination of the direction of the input face and the direction of the registered face.

The identification at a still higher accuracy can be realized by applying this configuration to a method called boosting as in the above-mentioned previous application, with which the feature points and feature orders statistically optimal for the identification are selected.

In addition, according to the present embodiment, by limiting the combination of the face angles, the statistically identifiable feature points and feature amounts can be selected, and a possibility of obtaining the angle invariant feature amounts is increased. As a result, it is possible to improve the performance of the face identification.

Then, in the image identification apparatus 1, as compared with the face identification processing using only the front direction which is performed in the related art, only the processing of switching the learning dictionary in accordance with the combinations of the face angles is added. Thus, at an operation amount substantially equal to the face identification processing in the related art, it is possible to execute the free view point face identification processing. In other words, the identification performance of the face image can be easily improved.

It should be noted that in a case where with respect to one input face, a plurality of registered faces are registered, for example, the facial similarity degree estimation unit 45 calculates the facial similarity degree with respect to the input face for all the registered faces, and thereafter, sequentially outputs scores in accordance with the facial similarity degrees. Than, the same number of scores as the registered faces registered in the registered face database 16 are input to the face identification unit 17. Thus, the face identification unit 17 may identify the registered face which obtains the highest score among the scores input from the facial similarity degree estimation unit 15 as the registered face similar to the input face.

In the above-mentioned manner, the facial similarity degree estimation processing is performed.

Incidentally, the learning dictionaries sorted by angle combinations 44A can be created, for example, by preparing a plurality of face image pairs of the same person or different persons which are combinations of the angles of the particular face and applying a predetermined learning processing on those face image pairs.

In view of the above, next, a dictionary learning apparatus 51 configured to generate the learning dictionaries sorted by angle combinations 44A will be described.

Figure 8:
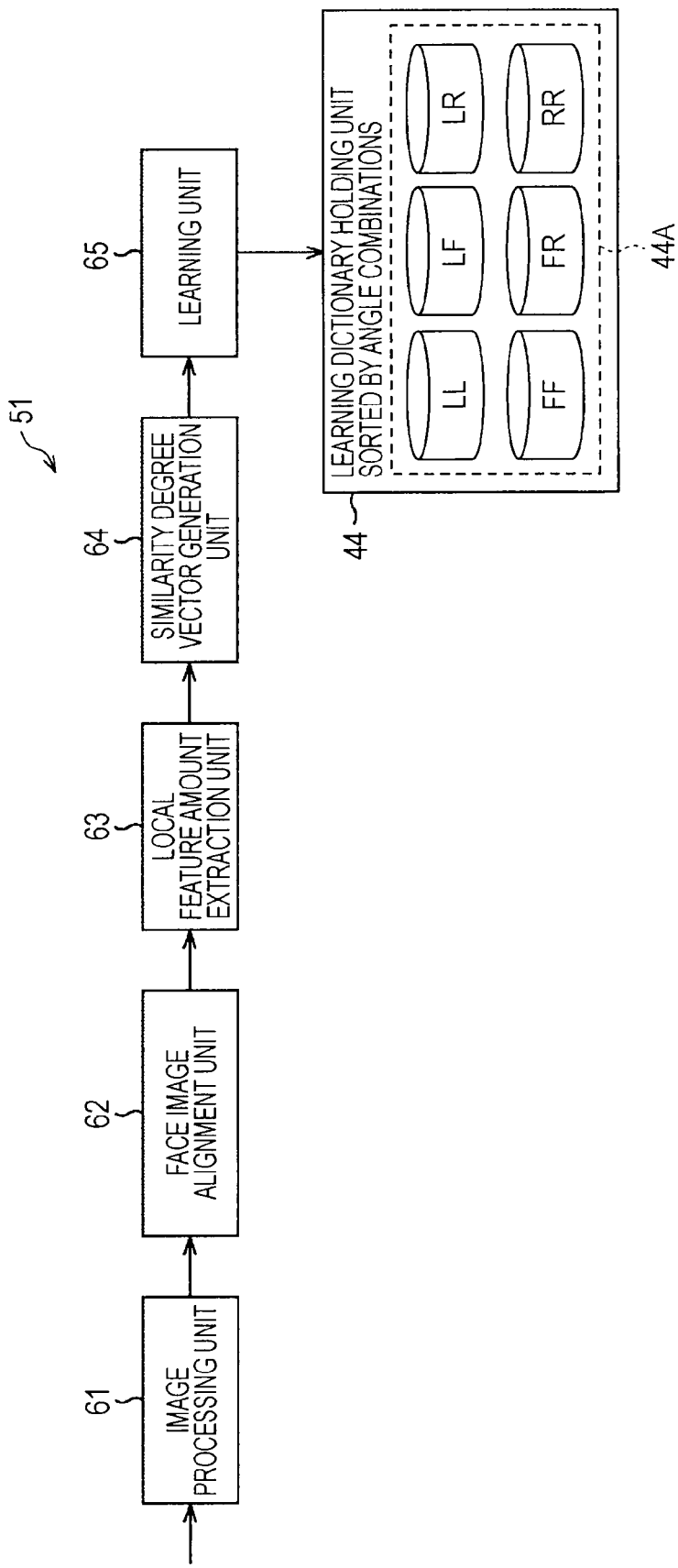
FIG. 8 illustrates a configuration example of a dictionary learning apparatus.

FIG. 8 illustrates a configuration example of the dictionary learning apparatus 51.

As illustrated in FIG. 8, the dictionary learning apparatus 51 is composed by including, in addition to the learning dictionary holding unit sorted by angle combinations 44 for holding the learning dictionaries sorted by angle combinations 44A corresponding to the learning dictionary holding unit sorted by angle combinations 44 of FIG. 5, an image processing unit 61, a face image alignment unit 62, a local feature amount extraction unit 63, a similarity degree vector generation unit 64, and a learning unit 65.

The image processing unit 61 obtains, for example, the face image pairs which are the combinations of the particular angles, and performs a predetermined image analysis processing on the thus obtained face image pairs to detect the face images and the facial feature positions. The detection processing for the face images and the facial feature positions is basically similar to the detection processing performed in the face detection unit 12 and the facial feature detection unit 13 of FIG. 2 described above, and therefore a description thereof will be omitted.

The face image and the facial feature positions detected for each of the face image pairs are supplied to the face image alignment unit 62.

The face image alignment unit 62 performs the alignment by analyzing the face images and the facial feature positions supplied from the image processing unit 61, and supplies the aligned face image pairs to the local feature amount extraction unit 63.

The local feature amount extraction unit 63 uses, for example, the images in the vicinity of the facial feature positions as they are or a convolution computation such as Gabor filter and Gaussian derivative filter with respect to the images in the vicinity of the facial feature positions in the face image pairs supplied from the face image alignment unit 62 to extract the respective local feature amounts. The local feature amount extraction unit 63 supplies the extracted the local feature amounts of the face image pairs to the similarity degree vector generation unit 64.

The similarity degree vector generation unit 64 calculates a correlation between the respective local feature amounts of the face image pairs supplied from the local feature amount extraction unit 63 to generate a similarity degree vector. The similarity degree vector generation unit 64 supplies the thus generated similarity degree vector to the learning unit 65.

The learning unit 65 learns which part of the similarity degree vector supplied from the similarity degree vector generation unit 64 is used, through so-called boosting. Then, the learning unit 65 generates the information such as the positions of the optimal feature points sorted by the combinations of the angles obtained through the learning as the learning dictionaries sorted by angle combinations 44A to be registered in the learning dictionary holding unit sorted by angle combinations 44.

Next, a processing performed by the dictionary learning apparatus 51 will be described.

Figure 9:
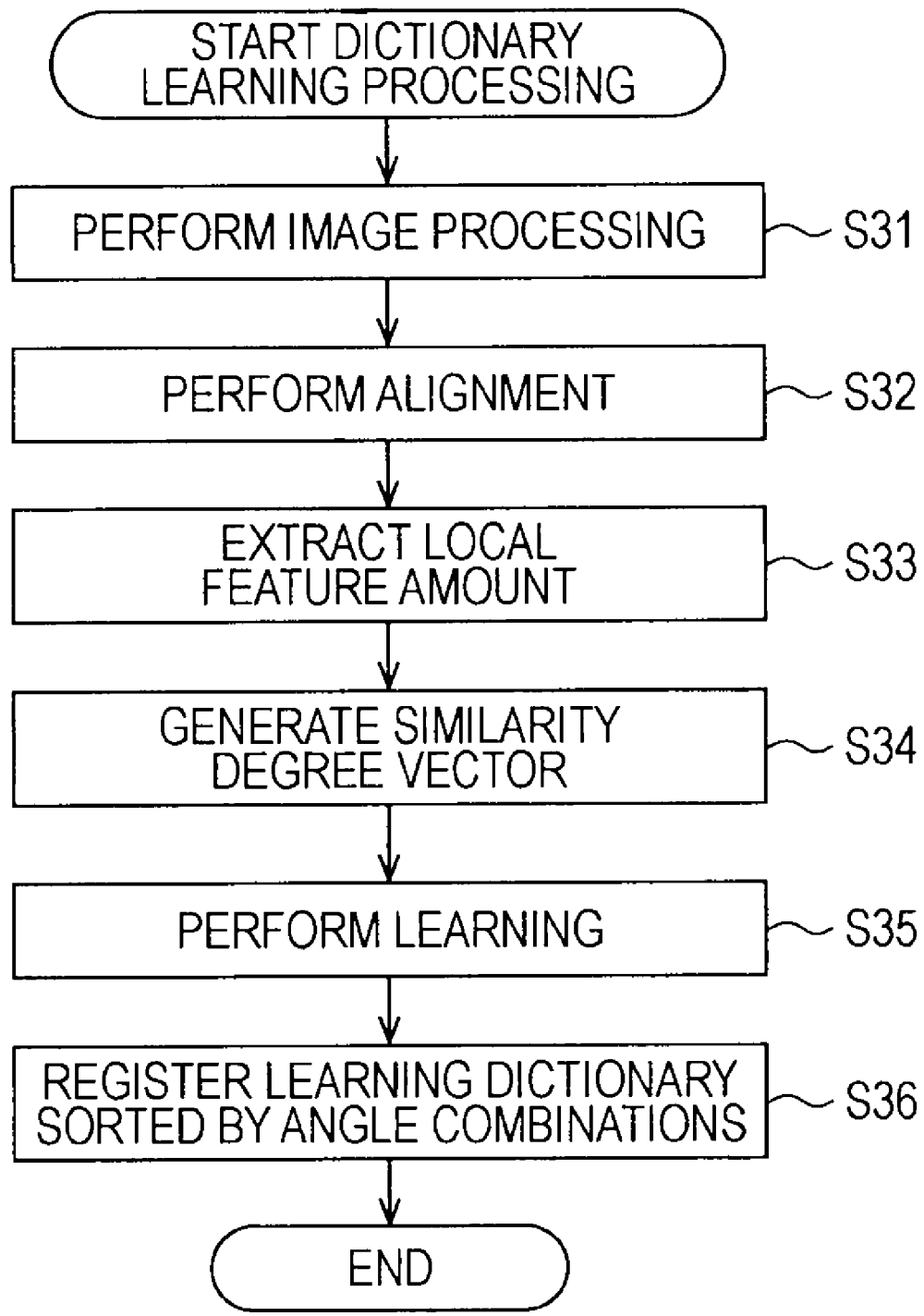
FIG. 9 is a flowchart for describing a dictionary learning processing.

A flowchart of FIG. 9 describes the dictionary learning processing executed by the dictionary learning apparatus 51 of FIG. 8.

In step S31, the image processing unit 61 performs a predetermined image analysis processing on the face image pairs which are the combination of the particular angles to detect the face images and the facial feature positions of the respective face image pairs. Then, the image processing unit 61 supplies the face images and the facial feature positions to the face image alignment unit 62.

It should be noted that in order to generate the highly accurate learning dictionaries sorted by angle combinations 44A, the number of samples is increased. Thus, it is preferable to prepare the face image pairs of the same person or the different persons which are the angle combination of the particular face as many as possible.

In step S32, the face image alignment unit 62 analyzes the face image and the facial feature positions of the respective face image pairs supplied from the image processing unit 61 to perform the alignment. The face image alignment unit 62 supplies the aligned face image pairs to the local feature amount extraction unit 63.

In step S33, the local feature amount extraction unit 63 uses, for example, the images in vicinity of the facial feature positions as they are with respect to the images in vicinity of the facial feature positions in the face image pairs supplied from the face image alignment unit 62 to extract the respective local feature amounts. The local feature amount extraction unit 63 supplies the extracted local feature amount of the face image pairs to the similarity degree vector generation unit 64.

In step S34, the similarity degree vector generation unit 64 calculates a correlation between the respective local feature amounts of the face image pairs supplied from the local feature amount extraction unit 63 to generate the similarity degree vector. The similarity degree vector generation unit 64 supplies the similarity degree vector to a learning unit 35.

In step S35, the learning unit 35 performs the learning through the boosting on the basis of the similarity degree vector supplied from the similarity degree vector generation unit 64.

In step S36, the learning unit 35 generates the information such as the positions of the optimal feature points sorted by the combinations of the angles obtained through the learning as the learning dictionaries sorted by angle combinations 44A to be registered in the learning dictionary holding unit sorted by angle combinations 44. Then, the dictionary learning processing is ended.

In the above-mentioned manner, the learning dictionary holding unit sorted by angle combinations 44 is generated.

It should be noted that according to the present embodiment, the description has been made while the image identification apparatus 1 is regarded as an apparatus different from the dictionary learning apparatus 51, but these apparatuses may be composed of a single apparatus in such a manner that the functions of the respective apparatuses can be realized by the single apparatus. In that case, as the dictionary learning apparatus 51 is included in the image identification apparatus 1 as the dictionary learning unit, a processing performed in both the face identification processing and the learning processing such as the face image detection processing detection processing can be executed in the same block.

As described above, according to the embodiments of the present invention, by limiting the combination of the face angles, the statistically identifiable feature points and feature amounts can be selected, and a possibility of obtaining the angle invariant feature amounts is increased. As a result, it is possible to improve the performance of the face identification. In consequence, the identification performance for the faces in different angles can be improved.

In addition, according to the embodiments of the present invention, as compared with the face identification processing using only the front direction which is performed in the related art, only the processing of switching the learning dictionary in accordance with the combinations of the face angles is added. Thus, at an operation amount substantially equal to the face identification processing in the related art, it is possible to execute the free view point face identification processing. In consequence, the identification performance of the face image can be easily improved.

The above-mentioned series of processing can be executed by using hardware and also executed by using software. In a case where the series of processing is execute by using the software, a program constituting the software is installed from a program recording medium into a computer which is accommodated in dedicated-use hardware or into a general-use personal computer, for example, which can execute various functions when various programs are installed.

Figure 10:
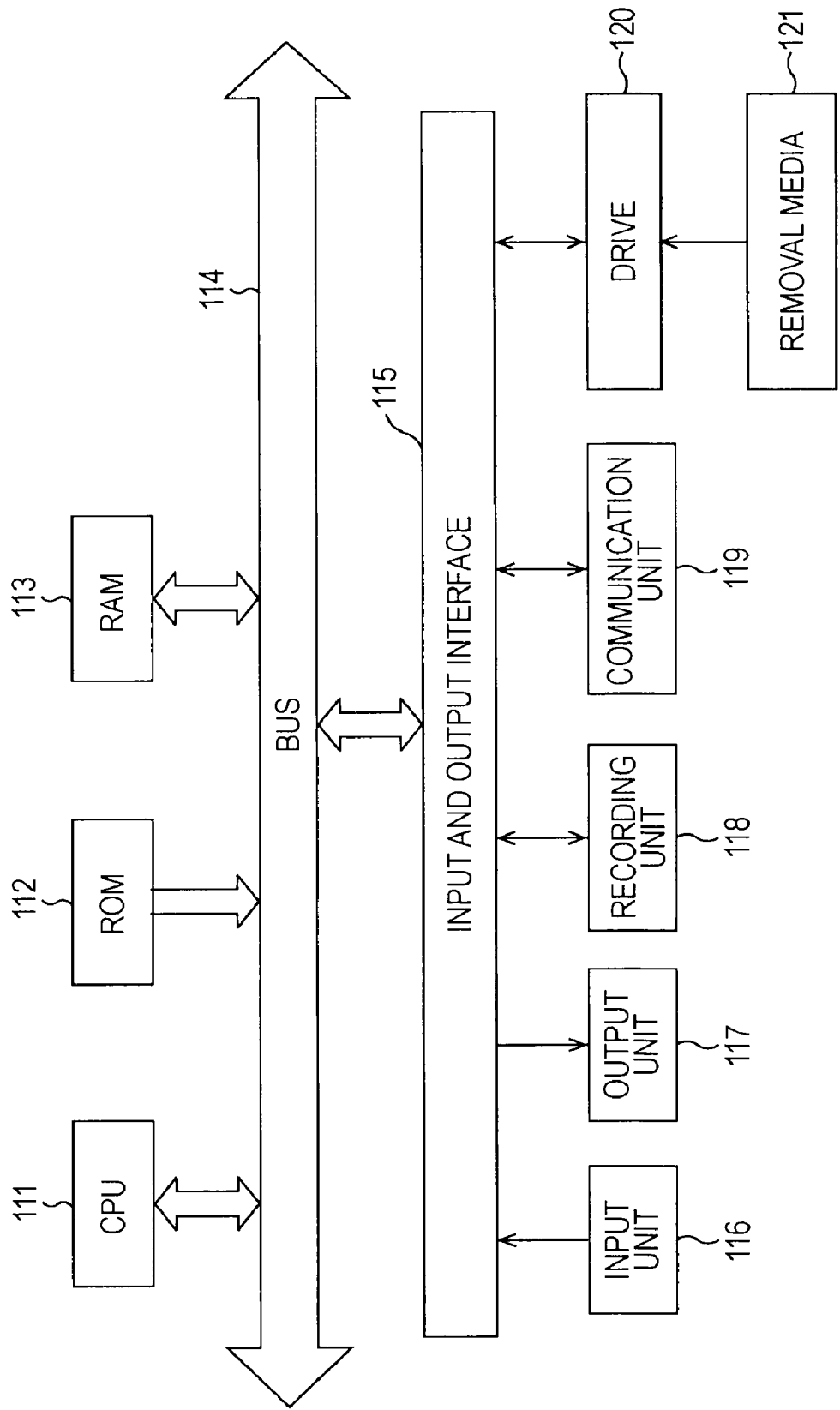
FIG. 10 illustrates a configuration example of a computer for executing an image processing to which an embodiment of the present invention is applied by using software.

FIG. 10 is a block diagram of a personal computer configuration example where the above-mentioned series of processing is executed by the program. A CPU (Central Processing Unit) 111 execute various processing following programs recorded in a ROM (Read Only Memory) 112 or a recording unit 118. A RAM (Random Access Memory) 113 appropriately stores the program executed by the CPU 111, data, and the like. The CPU 111, the ROM 112, and the RAM 113 are mutually connected by a bus 114.

An input and output interface 115 is connected to the CPU 111 via the bus 114. An input unit 116 composed of a micro phone and the like and an output unit 117 composed of a display, a speaker, and the like are connected to the input and output interface 115. The CPU 111 executes various processings in response to instructions input from the input unit 116. Then, the CPU 111 output a processing result to the output unit 117.

The recording unit 118 connected to the input and output interface 115 is composed, for example, of a hard disc drive. The recording unit 118 records the programs executed by the CPU 111 and various pieces of data. A communication unit 119 performs a communication with an external apparatus via a network such as the internet or a local area network.

In addition, a program may be obtained via the communication unit 119 to be recorded in the recording unit 118.

When removal media 121 such as a magnetic disc, an optical disc, an opto-magnetic disc, or a semiconductor disc is mounted to a drive 120 connected to the input and output interface 115, the drive 120 drive the removal media and obtains the program, data, and the like recorded therein. The thus obtained program and data are transferred the recording unit 118 as occasion demands and recorded.

The program recording medium storing the program which is installed into the computer and can executed by the computer is composed, as illustrated in FIG. 10, of the removal media 121 functioning as package media such as a magnetic disc (including a flexible disc), an optical disc (including CD-ROM (Compact Disc-Read Only Memory), or DVD (Digital Versatile Disc)), an opto-magnetic disk, or a semi-conductor memory, or composed of the ROM 112 temporarily or continuously storing the program, a hard disc drive constituting the recording unit 118, or the like. Storage of the program in the program recording medium is performed by utilizing a wired or wireless communication medium such as the local area network, the internet, or digital satellite broadcasting via the communication unit 119 functioning as an interface such as a router or a modem as occasion demands.

It should be noted that in the present specification, the processing includes not only a case where the steps describing the program which is stored in the recording medium are performed in the stated order in a time series manner, but also a case where the steps are performed in parallel or individually instead of being performed in the time series.

Also, the embodiments of the present invention are not limited to the above-described embodiments and it should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    holding means for holding a plurality of learning dictionaries, each of the learning dictionaries corresponding to a combination of face angles indicating a direction of a face of a first face image and a face of a second face image, each learning dictionary including information related to positions of feature points which associate the first face image with the second face image;
    face angle estimation means for calculating a first angle and a second angle, of the combination of face angles, indicating a direction of the faces in the first and second face images;

extraction means for extracting a feature amount from the first face image and the second face image;

selection means for selecting a learning dictionary, of the plurality of learning dictionaries, which corresponds to the first angle and the second angle calculated by the face angle estimation means; and similarity degree estimation means for calculating a facial similarity degree between the first face image and the second face image on the basis of the feature amount extracted from the first face image and the feature amount extracted from the second face image, wherein the feature amounts extracted from the first and second face images correspond to the information related to positions of the feature points included in the selected learning dictionary.

2. The image processing apparatus according to claim 1, further comprising:

identification means for identifying that an identical face is present in both the first face image and the second face image on the basis of the estimated similarity degree.

3. The image processing apparatus according to claim 1, wherein the second face image is registered in advance, the registering including storing in the holding means, while being associated with the extracted feature amounts and the second angle.

4. The image processing apparatus according to claim 3, further comprising:

detection means for detecting a part of the first face image from an image including a human being; and facial feature detection means for detecting a facial feature position which is a feature of the face from the detected first face image, wherein the face angle estimation means calculates the first angle on the basis of the detected first face image and the facial feature position, the extraction means extracts a feature amount from an image in the vicinity of the facial feature position in the detected first face image, the selection means selects the learning dictionary in accordance with the combination of the calculated first angle and the registered second angle, and the similarity degree estimation means calculates the similarity degree on the basis of the feature amount extracted from the first face image and the feature amount of the registered second face image corresponding to the positions of the feature points included in the selected learning dictionary.

5. The image processing apparatus according to claim 1, wherein the holding means holds the learning dictionaries for all the combinations in a case where the direction indicated by the first angle is set in three stages including a left direction, a front direction, and a right direction and the direction indicated by the second angle is set in three stages including a left direction, a front direction, and a right direction.

6. The image processing apparatus according to claim 2, wherein the learning dictionary includes a predetermined threshold which functions as a reference for identifying the first face image and the second face image, and wherein the identification means identifies whether the face of the first face image and the face the second face image are a same person or different persons on the basis of a result of a comparison between the estimated similarity degree and the threshold.

7. An image processing method comprising the steps of:

holding a plurality of learning dictionaries, each of the learning dictionaries corresponding to a combination of face angles indicating a direction of a face of a first face image and a face of a second face image, each learning dictionary including information related to positions of feature points which associate the first face image with the second face image;

calculating a first angle and a second angle, of the combination of face angles, indicating a direction of the faces in the first and second face images;

selecting a learning dictionary, of the plurality of learning dictionaries, which corresponds to the calculated first angle and the calculated second angle;

extracting a feature amount from the first face image and the second face image; and calculating a facial similarity degree between the first face image and the second face image on the basis of the feature amounts extracted from the first face image and the second face image, wherein the extracted feature amounts from the first and second face images correspond to the information related to positions of the feature points included in the selected learning dictionary.

8. A non-transitory computer readable medium having instructions stored therein that when executed by a computer performs the steps of:

holding a plurality of learning dictionaries, each of the learning dictionaries corresponding to a combination of face angles indicating a direction of a face of a first face image and a face of a second face image, each learning dictionary including information related to positions of feature points which associate the first face image with the second face image;

calculating a first angle and a second angle, of the combination of face angles, indicating a direction of the faces in the first and second face images;

selecting a learning dictionary, of the plurality of learning dictionaries, which corresponds to the calculated first angle and the calculated second angle;

extracting a feature amount from the first face image and the second face image; and calculating a facial similarity degree between the first face image and the second face image on the basis of the feature amounts extracted from the first face image and the second face image, wherein the extracted feature amounts from the first and second face images correspond to the information related to positions of the feature points included in the selected learning dictionary.

9. An image processing apparatus comprising:

holding means for holding a plurality of learning dictionaries, each of the learning dictionaries corresponding to a combination of angles indicating a direction of an object or a living matter having a predetermined shape and feature of a first image and an object or a living matter having a predetermined shape and feature of a second image, each learning dictionary including information related to positions of feature points which associate the first image with the second image;

angle estimation means for calculating a first angle and a second angle, of the combination of angles, indicating a direction of an object or a living matter in the first and second images;

extraction means for extracting a feature amount from the first image and the second image;

selection means for selecting a learning dictionary, of the plurality of learning dictionaries, which corresponds to the first angle and the second angle calculated by the angle estimation means; and similarity degree estimation means for calculating a similarity degree between the first image and the second image on the basis of the feature amount extracted from the first image and the feature amount extracted from the second image, wherein the feature amounts extracted from the first and second images correspond to the information related to positions of the feature points included in the selected learning dictionary.

10. An image processing method comprising the steps of:

holding a plurality of learning dictionaries, each of the learning dictionaries corresponding to a combination of angles indicating a direction of an object or a living matter having a predetermined shape and feature of a first image and an object or a living matter having a predetermined shape and feature of a second image, each learning dictionary including information related to positions of feature points which associate the first image with the second image;

calculating a first angle and a second angle, of the combination of angles, indicating a direction of an object or a living matter in the first and second images;

selecting a learning dictionary, of the plurality of learning dictionaries, corresponding to the calculated first angle and the calculated second angle;

extracting a feature amount from the first image and the second image; and calculating a similarity degree between the first image and the second image on the basis of the feature amounts extracted from the first image and the second image, wherein the extracted feature amounts correspond to the information related to positions of the feature points included in the selected learning dictionary.

11. A non-transitory computer readable medium having instructions stored therein that when executed by a computer performs the steps of:

holding a plurality of learning dictionaries, each of the learning dictionaries corresponding to a combination of angles indicating a direction of an object or a living matter having a predetermined shape and feature of a first image and an object or a living matter having a predetermined shape and feature of a second image, each learning dictionary including information related to positions of feature points which associate the first image with the second image;

calculating a first angle and a second angle, of the combination of angles, indicating a direction of an object or a living matter in the first and second images;

selecting a learning dictionary, of the plurality of learning dictionaries, corresponding to the calculated first angle and the calculated second angle;

extracting a feature amount from the first image and the second image; and calculating a similarity degree between the first image and the second image on the basis of the feature amounts extracted from the first image and the second image, wherein the extracted feature amounts correspond to the information related to positions of the feature points included in the selected learning dictionary.

12. An image processing apparatus comprising:

a processor circuit including a holding unit configured to hold a plurality of learning dictionaries, each of the learning dictionaries corresponding to a combination of face angles indicating a direction of a face of a first face image and a face of a second face image, each learning dictionary including information related to positions of feature points which associate the first face image with the second face image;

face angle estimation unit for calculating a first angle and a second angle, of the combination of face angles, indicating a direction of the faces in the first and second face images;

extraction unit for extracting a feature amount from the first face image and the second face image;

a selection unit configured to select a learning dictionary, of the plurality of learning dictionaries, which corresponds to the first angle and the second angle calculated by the face angle estimation unit; and a similarity degree estimation unit configured to calculate a facial similarity degree between the first face image and the second face image on the basis of the feature amount extracted from the first face image and the feature amount extracted from the second face image, wherein the feature amounts extracted from the first and second face images correspond to the information related to positions of the feature points included in the selected learning dictionary.

13. An image processing apparatus comprising:

a processor circuit including a holding unit configured to hold a plurality of learning dictionaries, each of the learning dictionaries corresponding to a combination of angles indicating a direction of an object or a living matter having a predetermined shape and feature of a first image and an object or a living matter having a predetermined shape and feature of a second image, each learning dictionary including information related to positions of feature points which associate the first image with the second image;

angle estimation unit for calculating a first angle and a second angle, of the combination of angles, indicating a direction of an object or a living matter having a predetermined shape and feature;

extraction unit for extracting a feature amount from the first image and the second image;

a selection unit configured to select a learning dictionary, of the plurality of learning dictionaries, which corresponds to the first angle and the second angle calculated by the angle estimation means; and a similarity degree estimation unit configured to calculate a similarity degree of the object or the living matter between the first image and the second image on the basis of the feature amount extracted from the first image and the second image, wherein the feature amounts extracted from the first and second images correspond to the information related to positions of the feature points included in the selected learning dictionary.

14. The image processing apparatus according to claim 12, further comprising:

an identification unit configured to identify that an identical face is present in both the first face image and the second face image on the basis of the estimated similarity degree.

15. The image processing apparatus according to claim 12, wherein the second face image is registered in advance, the registering including storing in the holding means, while being associated with the extracted feature amounts and the second angle.

16. The image processing apparatus according to claim 12, wherein the holding unit holds the learning dictionaries for all the combinations in a case where the direction indicated by the first angle is set in three stages including a left direction, a front direction, and a right direction and the direction indicated by the second angle is set in three stages including a left direction, a front direction, and a right direction.

17. The image processing apparatus according to claim 13, wherein the learning dictionary includes a predetermined threshold which functions as a reference for identifying the first face image and the second face image, and wherein the identification unit identifies whether the face of the first face image and the face the second face image are a same person or different persons on the basis of a result of a comparison between the estimated similarity degree and the threshold.

18. The image processing apparatus according to claim 15, further comprising:

a detection unit configured to detect a part of the first face image from an image including a human being; and a facial feature detection unit configured to detect a facial feature position which is a feature of the face from the detected first face image, wherein the face angle estimation unit calculates the first angle on the basis of the detected first face image and the facial feature position, the extraction unit extracts a feature amount from an image in the vicinity of the facial feature position in the detected first face image, the selection unit selects the learning dictionary in accordance with the combination of the calculated first angle and the registered second angle, and the similarity degree estimation unit calculates the similarity degree on the basis of the feature amount extracted from the first face image and the feature amount of the registered second face image corresponding to the positions of the feature points included in the selected learning dictionary.

* * * * *